July 21, 1925.

J. H. O'NEILL 1,546,744

JET REACTION TURBINE

Filed Aug. 21, 1922    5 Sheets-Sheet 2

INVENTOR.
John Hugh O'Neill

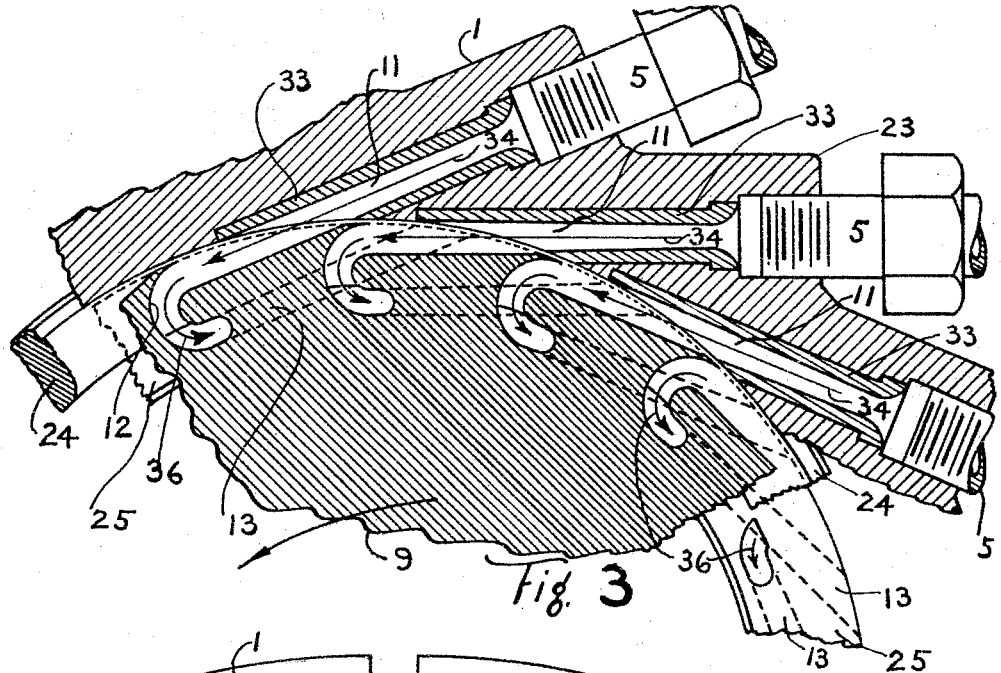
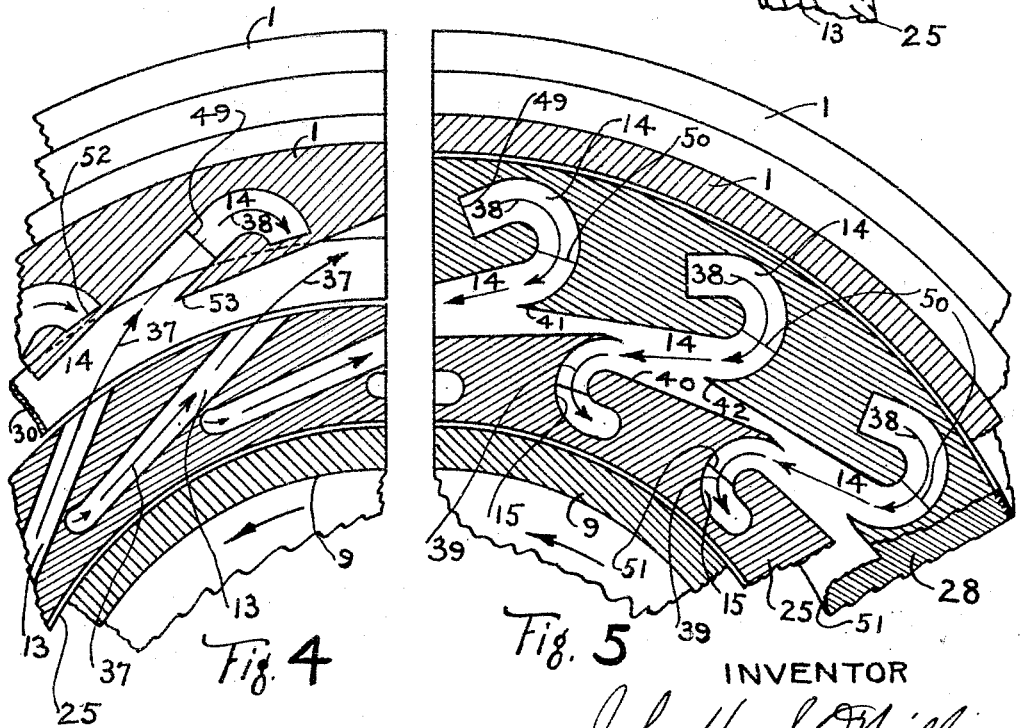

INVENTOR
John Hugh O'Neil

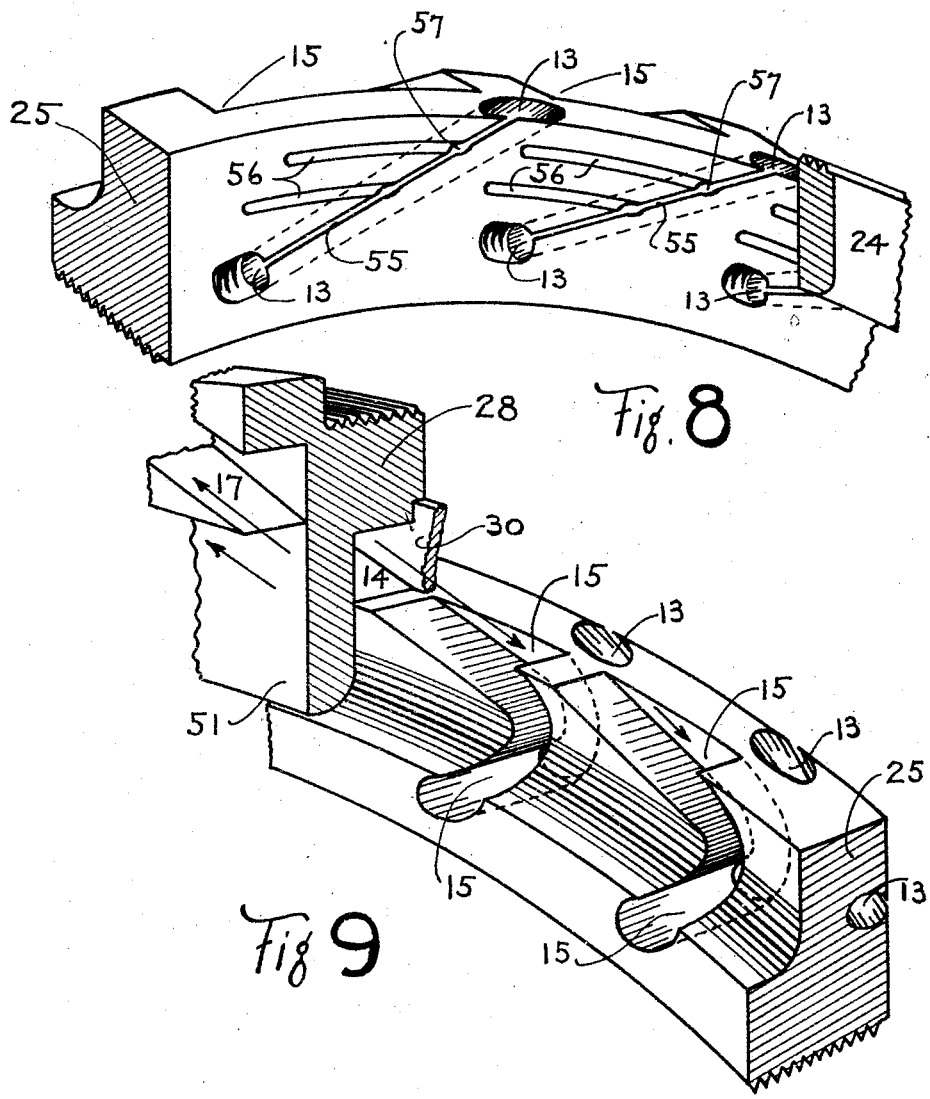

Patented July 21, 1925.

1,546,744

UNITED STATES PATENT OFFICE.

JOHN HUGH O'NEILL, OF SPRINGFIELD, MISSOURI.

JET-REACTION TURBINE.

Application filed August 21, 1922. Serial No. 583,228.

*To all whom it may concern:*

Be it known that I, JOHN HUGH O'NEILL, a citizen of the United States, and residing at Springfield, Missouri, have invented new Improvements in Jet-Reaction Turbines, which are fully set forth in the following specification.

My invention relates to improvements in turbines operated by an expansive fluid. Such fluid will be referred to as steam in this specification. My invention consists of constructions and combinations and arrangements applied to a turbine of two elements; viz, (1) a stator or casing, surrounding (2) a rotor of drum type.

The object of my invention is to provide in a single turbine a construction suitable for expanding steam to atmospheric pressure or lower, from pressure up to 3,000 pounds per square inch and temperatures up to 1,100 degrees F. in which the stator or casing ring may be made in one piece, thus attaining the maximum strength per unit of weight.

I attain my objects by mechanisms such as those illustrated in the accompanying drawings, in which:

Fig. 3 is a partial cross section of a turbine along line 3—3 of Fig. 2.

Fig. 4 is a partial cross section on line 4—4 of Fig. 2.

Fig. 5 is a partial cross section on line 5—5 of Fig. 2.

Fig. 8 is a partial cross section shown in perspective view of a rotor U channel ring 25 and stator diaphragm ring 24 of Fig. 2.

Fig. 9 is a partial cross section shown in perspective view of the other side of rotor U channel ring 25 of Fig. 2.

Figure 1:
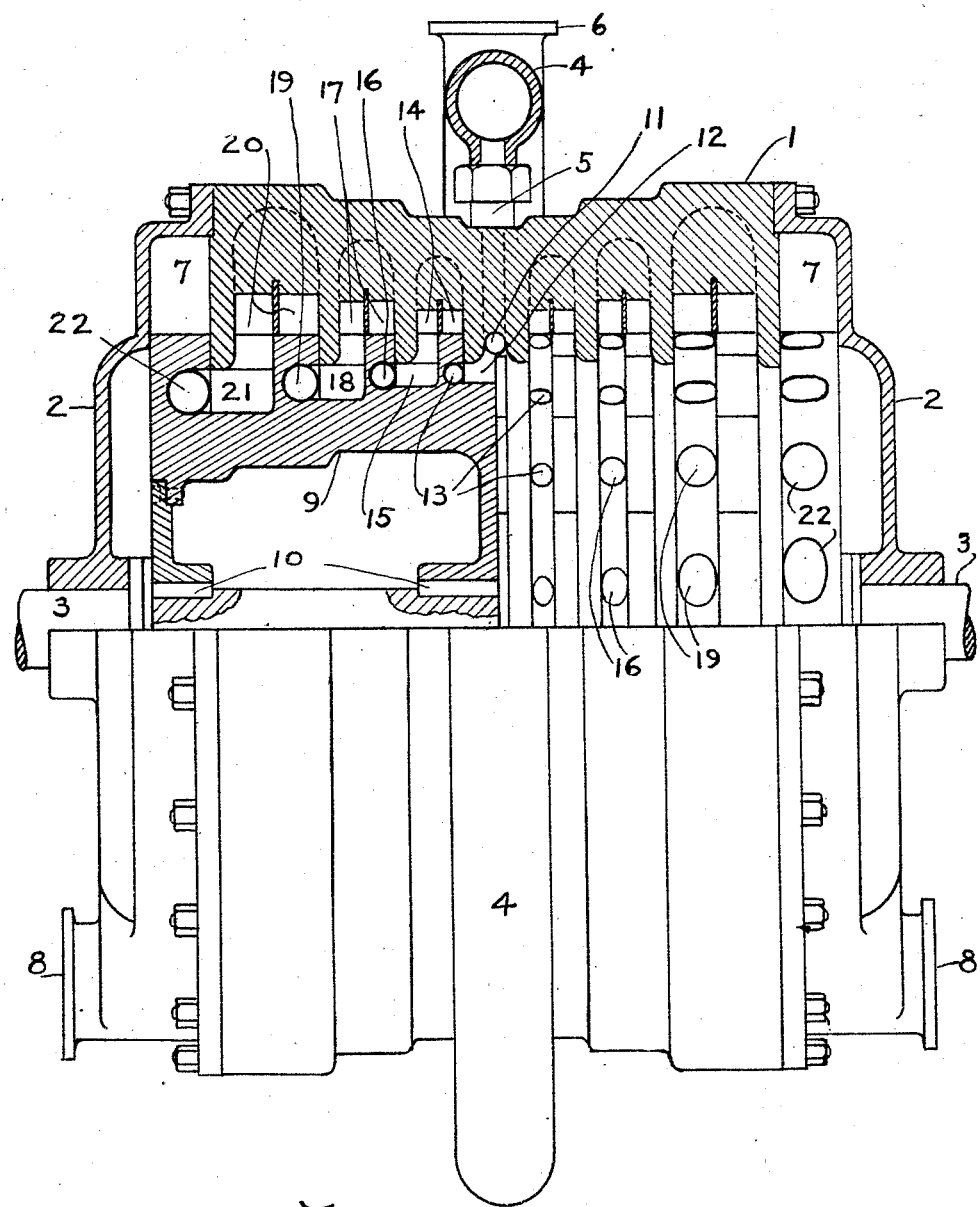
Fig. 1 is a diagrammatic, partially sectional view of a jet reaction turbine.

Referring to the drawings which illustrate an embodiment of my invention: The curved end or bend of the U shaped channel lies in a plane at an angle to the axis of the turbine in order to better accommodate a pressure stage dividing diaphragm which is placed between the legs of the U channels.

In all the figures similar parts bear similar numbers. 1 is the stator casing or ring of the turbine. 2 and 2 are the end pieces which support the rotor shaft 3. 4 is an extension of the steam main and surrounds the turbine. Connection shown in Fig. 1 is made from steam main extension 4 by an annular row of connecting pipes 5 to the admission nozzles 11. Admission nozzles 11 may be provided with linings 33. 6 is the joint to the steam line. Any suitable connection to the admission nozzles may be used. 7 and 7 are annular exhaust steam passages which lead the exhaust steam to the exhaust pipes 8 and 8. 9 is the rotor drum keyed to the shaft 3 at 10. Steam from main extension 4 enters the turbine through connecting pipes 5, passes to steam admission nozzles 11 and issues as jets from nozzles 11 into impulse receiving buckets 12 which are the first legs of U shaped channels carried in two annular rows on the rotor in the preferred construction and machined right and left hand so as to divide the steam and carry it toward both ends of the turbine. 13, 13 are jet reaction nozzles which form the second legs of the U shaped channels 12—13. (U shaped channels on the rotor are referred to hereafter using the double number composed of the numbers which designate each leg, while in the stator the U channels are referred to by a single number.) All U channels in both rotor and stator reverse the direction of the steam. The steam is discharged as jets from nozzles 13 on the rotor in a direction opposite to the rotation of the rotor, the rotor being impelled by the impact of the steam in the impulse receiving buckets and by the reaction from the jets in the jet reaction nozzles. Steam from nozzles 13 is received in the first legs of U shaped channels 14 in the stator. These first legs of U channel 14 are shown machined in the metal of casing 1 in Figs. 2 and 4. The steam is reversed in direction in U channels 14 and is delivered through the second legs of channels 14 into impulse receiving buckets 15 on the rotor. Receiving buckets 15 are the first legs of U shaped channels 15—16 which are on the rotor. The second legs of U channels 15—16 are the jet reaction nozzles 16. The steam flows from nozzles 16 to steam direction reversing U channels 17 in the stator, to U channels 18—19 on the rotor, to U channels 20 on the stator, and to U channels 21—22 on the rotor. From jet reaction nozzle 22 the steam passes to the annular exhaust passages 7 and 7. Lugs 23 are preferably provided for steam connections 5, 5. The number of alternate passages between stator and rotor is dependent on whether the turbine is designed for many or few expansions of steam as is necessary in adapting the turbine to steam which has many or few B. t. u. available for work. The number of such passages may be more or less than those shown without departing from the spirit of my invention.

Steam admission nozzles 11, U shaped channels 14, 17 and 20 are arranged in annular rows in the turbine stator or casing 1. The U shaped channels may be of uniform cross section or may vary in cross section. The first legs may have variation in cross section as shown near 53 in Fig. 4. The points 53 are not brought down to a close clearance with the rotor in this case in order to provide continuous passages for the steam which is flowing at high velocity from nozzles on the rotor (such as nozzles 13 in Fig. 4). Thus there is formed an annular groove or slot between points 53 and the rotor surface. This annular groove is useful where a turbine is designed for a moderate amount of power and the nozzles, as 13, are spaced far apart in the annular row on the rotor, and also the direction reversing passages 14 are spaced far apart in the annular row in the stator. Where a turbine is designed for a heavy output of power the nozzles on the rotor are crowded together in each annular row and the U channels in the stator are also close together, in each annular row and the points 53 are preferably brought into close clearance with the rotor. In this case, the annular groove referred to above is not formed and the cross section of this first leg is uniform. Where the steam is reversed in direction in the U channels in the stator at substantially uniform pressure and velocity the second or delivery leg is of uniform cross section as at 14 in Figs. 5 and 7. Where the steam is expanded and increased in velocity in this second leg, the leg is diverging in cross section. The U shaped channels 12—13, 15—16, 18—19 and 21—22 are in annular rings on the rotor and are constructed to utilize the impulse from the impact of the steam entering the first legs or receiving buckets 12, 15, 18, and 21 and to also utilize the reaction from the jets in which the steam leaves the rotor through the second legs or jet reaction nozzles 13, 16, 19 and 22.

Figure 2:
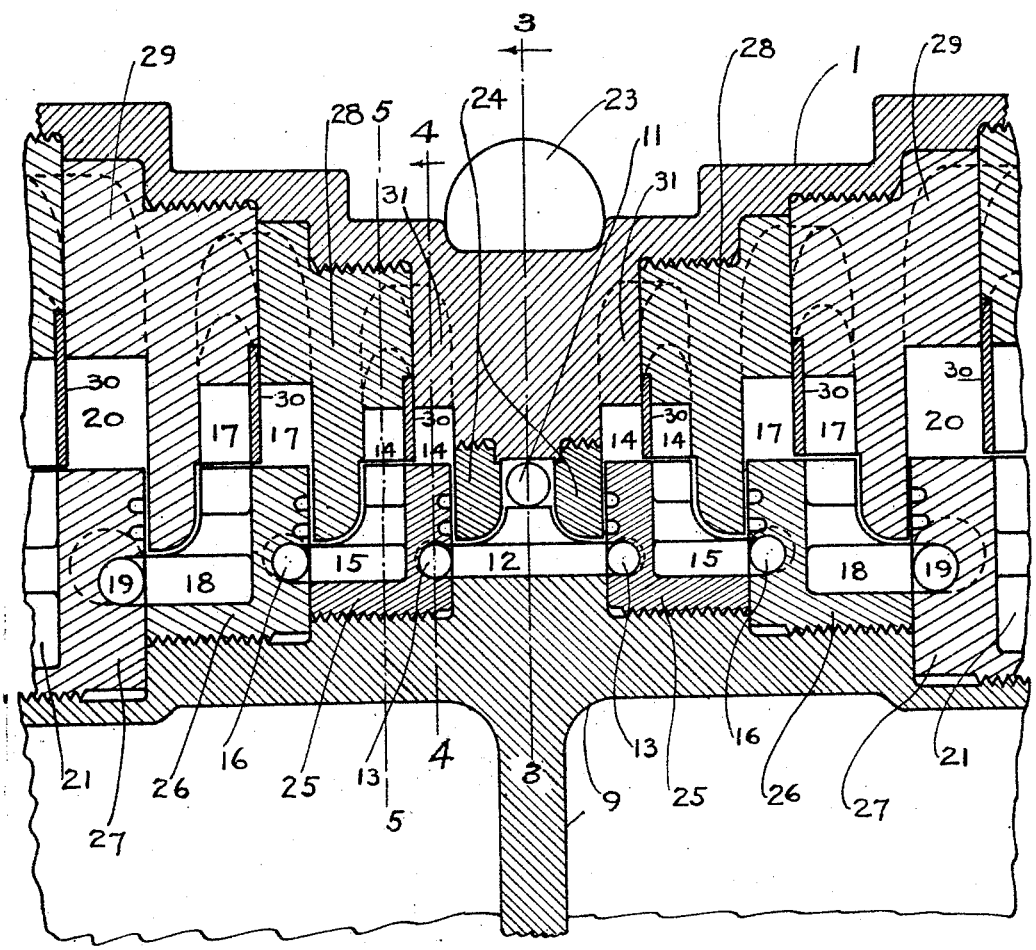
Fig. 2 is a partial section taken longitudinally with the axis of the turbine.

The U shaped channels may be conveniently formed by machining in the side faces of annular rings parts of the U channels which, when the rings are assembled together, will form completed U shaped channels. These rings are made for both stator and rotor and right and left hand. Such rings are 28 and 29 in the stator and 25, 26 and 27 on the rotor. The separator rings 30 cooperate with U channel rings in the stator to make dividing partitions between the legs of the U channels as between ring 28 and the casing 1 which at 31 has the first leg of U channel 14 machined in it to form U channel 14, and between U channel rings 28 and 29 to form U channel 17. Ring 30 is stationary and is held clamped by the abutting channel rings. Where it is desired to expand the steam in the second legs of U channels in the stator the rings 30 may be attached to the rotor and revolve in registering slots in the stator, as diaphragms. Diaphragms are used to assist in maintaining pressure differences and are shown in the preferred construction as projecting from the stator only. Diaphragm rings 24 project from the stator into annular grooves in the rotor and separate the legs of U channel 12—13 so that the steam received in the first or impulse receiving leg 12 is guided into the second leg or jet reaction nozzle 13. Projections 51 on U channel rings 28 and 29 also act to form diaphragms. Referring to Figs. 2 and 8 the clearance between ring 24 which projects from the stator and U channel ring 25 which is on the rotor should be small in order that the steam be forced to enter the ends of jet reaction nozzles 13 which open below the ring 24 and opposite impulse receiving buckets 12. Some steam will leak into the clearance space between diaphragm ring 24 and U channel ring 25. In order that the loss of energy by such leakage be reduced as much as possible, slots 55 are cut leading from the face of U ring 25 which is adjacent to ring 24 to the jet reaction nozzle 13 so that this leakage steam will flow through slots 55 into the nozzles 13 and travel with the steam flowing in the nozzles and be utilized in some degree to augment the reactions. For the further prevention of leakage loss, small grooves 56 are also cut in the same face of U ring 25 and are led into the slot 55, as at 57 where such leakage steam as is picked up in grooves 56 mingles with the main current of steam flowing through nozzles 13. These slots 55 and grooves 56 are also used on rotor U channel rings 26 and 27. For large power outfits the jet reaction nozzles may be crowded together and may be of rectangular section and cut into the face of ring 25 as is slot 55. Thus the full nozzle cross section would perform the function of slot 55 and grooves 56 may be omitted.

The path of the steam may be followed in part in Figs. 3, 4 and 5 which are respective sections of Fig. 2. Steam from pipes 5 flows through admission nozzles 11 in the stator as per arrows 34 into impulse receiving buckets 12 on the rotor as shown by arrows 36. The lower ends of buckets 12 register with the openings of jet reaction nozzles 13 which are located in U channel rings 25 on the rotor. From nozzles 13 the steam flows into direction reversing U channels 14 in the stator as per arrow 37. At arrows 38 the steam direction is reversed and also passes axially over the separator ring 30 at 52, and at arrow 39 again passes to the rotor into impulse receiving buckets 15 which are on the opposite side of U ring 25. An approach to the impulse receiving buckets 15 is shown cut out at 40 which enables the buckets to continuously receive the full steam flow from U channels 14. 41 and 42 indicate the points where the metal between the U channels 14 and 14 in the stator end at points in close clearance with the rotor.

Figure 6:
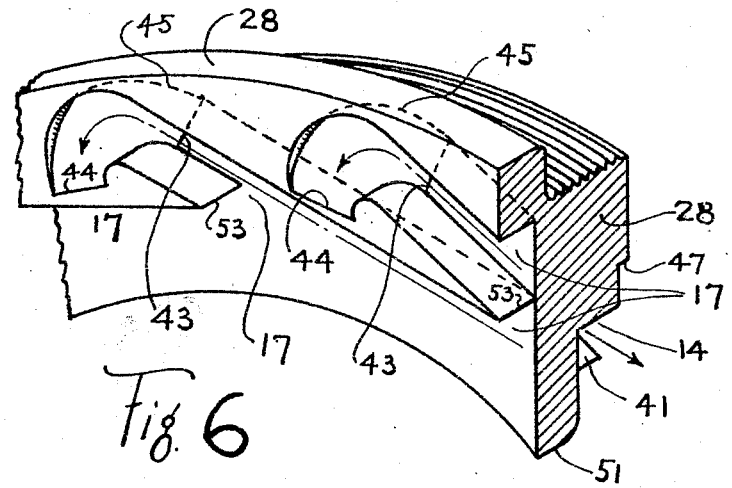
Fig. 6 is a partial cross section shown in perspective view of a stator U channel ring 28 of Fig. 2.
Figure 7:
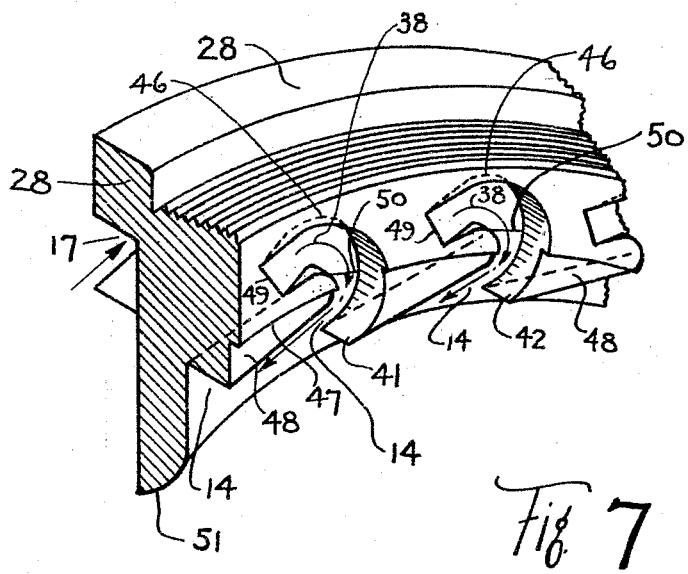
Fig. 7 is a partial cross section shown in perspective view of the opposite side of stator U channel ring 28 of Fig. 2.

For additional clearness in understanding the construction of rings for U shaped channels in the stator Figs. 6 and 7 are drawn in perspective. In Fig. 6 the slots forming the first legs of U channels 17 are machined full depth in the U channel ring 28 to the lines 43 from which point the depth decreases to nothing at lines 44. At this point the U channel crosses over one of the separating rings 30 shown in Fig. 2. Part of the outline of the first legs of channels 17 are shown in dotted lines 45.

In Fig. 7 46 shows in dotted lines how the second leg of U shaped channels 14 increases in depth from the line 49 which increase reaches full depth at line 50. 47 indicates a notch cut in the face of U ring 28 to accommodate a separating ring 30 and 48 is the surface against which ring 30 is clamped. 51 is the projection which forms a diaphragm registering with an annular slot in the rotor. This diaphragm 51 has close clearance on its straight side with the next U channel ring 26 on the rotor and performs the same function as diaphragm ring 24.

Perspective views of U channel ring 25 on the rotor with jet reaction nozzles 13 and impulse receiving buckets 15 and diaphragm ring 24 are shown in Fig. 8. It is intended that the steam pressure in the nozzles (as nozzles 13) be less than in the receiving buckets (as buckets 12), by an amount sufficient to cause the steam to flow with the desired velocity through the nozzles. The function of the diaphragms (as diaphragms 51 or diaphragm ring 24) is to aid in maintaining this pressure difference by guiding the steam in a direction to minimize leakage.

Separator ring 30 and U channel ring 28 of the stator, and U channel ring 25 of the rotor, are shown in related position in Fig. 9. In this figure the steam from the second leg of U channel 14 in the stator flows into impulse receiving bucket 15 in the rotor U channel ring 25 in a direction at right angles to the axis, and in the last part of bucket 15 is changed in its course to a direction parallel to the axis and passes under the diaphragm 51. Admission holes in the adjoining rotor U channel ring 26 (not shown) register with the lower ends of buckets 15 to jet reaction nozzles 16 in this adjoining ring 26.

From the above description it will be seen that my invention provides a turbine in which the U shaped channels on the rotor and in the stator are placed with the open ends of both legs substantially on the periphery of the rotor with one leg advanced axially in relation to the other and with the axes of the legs of each U channel in the rotor substantially at right angles to a radial line in the rotor with the curved end of the U channel pointing toward the radial line and in the direction of rotation. The axes of the legs of each U channel in the stator are substantially tangent to the periphery of the circle of the bore of the stator with the curve of the U channel pointing away from the periphery and opposite to the direction of rotation of the rotor. The main idea in my invention is to provide an annular row of continuous paths of increasing cross section for the steam. The increase of cross section is so proportioned that when the rotor is travelling at its normal speed the steam velocity in no part of the channel will much exceed twice the speed of the periphery of the rotor. In my invention the steam flows in substantially continuous channels and in general in opposite directions axially from the center of the turbine to the ends to exhaust, but in so flowing, traverses a plurality of zigzag paths through U shaped channels in passing alternately back and forth between the rotor and the stator. Each of said paths comprise an admission nozzle and a series of U channels.

The continuous steam path composed of alternate U shaped channels in the stator and on the rotor of drum type may be constructed in a great variety of ways.

I claim:

1. In a jet reaction turbine a structure forming a stator, a structure forming a drum type rotor, said rotor being adapted to be rotated in said stator by an expansive motive fluid, said stator being provided with a plurality of admission nozzles, said nozzles being arranged in an annular row, said annular row of admission nozzles being located in the center of said stator, said rotor being provided with a plurality of U-shaped channels, said U-shaped channels being arranged in a plurality of annular rows on said rotor, said U-shaped channels on the rotor being adapted to receive motive fluid in the first legs, to reverse its direction and to discharge the same from the second legs, said stator being provided with a plurality of U-shaped channels, said U-shaped channels being arranged in a plurality of annular rows in said stator, said U-shaped channels in the stator being adapted to receive motive fluid from the second or discharge legs of U-shaped channels on said rotor into the first or receiving legs, to reverse its direction and to discharge the same from the second legs, said admission nozzles and U-shaped channels being adapted to form an annular row of continuous passages of increasing cross section for said motive fluid, said continuous passages commencing at the center of said turbine and extending toward the ends of said turbine in substantially parallel zigzag courses, said passages being adapted to pass said motive fluid alternately from said rotor to said stator and from said stator to said rotor.

2. In a jet reaction turbine for expansive motive fluid a stator, a drum type rotor, structures forming an annular row of admission nozzles and a plurality of annular rows of U-shaped channels in said stator, structures forming a plurality of annular rows of U-shaped channels on said rotor, said U-shaped channels in the stator and on the rotor being adapted to receive motive fluid in the first legs, to reverse the direction of said motive fluid in the curved parts and to discharge said motive fluid from the second legs, said U-shaped channels in said stator being placed overlapping axially said U-shaped channels on said rotor, said admission nozzles and said U-shaped channels being adapted to form an annular row of continuous channels, said continuous channels being adapted to convey said motive fluid substantially in an axial direction from admission to exhaust in zigzag paths, each of said paths being formed by an admission nozzle and by a succession of U-shaped channels alternately located in said stator and on said rotor.

3. In a jet reaction turbine for expansive motive fluid a structure forming a stator, a structure forming a drum type rotor, said stator being provided with a plurality of annular rows of U-shaped channels, said rotor being provided with a plurality of annular rows of U-shaped channels, said annular rows of U-shaped channels being arranged in a series, successive rows of U-shaped channels in said series being located alternately in said stator and on said rotor, successive rows of U-shaped channels in said stator being composed of U-shaped channels of progressively larger cross section, successive rows of U-shaped channels on said rotor being composed of U-shaped channels of progressively larger cross section, said stator being provided with a plurality of annular diaphragms, said diaphragms being each located between successive annular rows of U-shaped channels in said stator, said rotor being provided with a plurality of annular slots on its periphery, said slots being formed between the legs of the U-shaped channels in each annular row of U-shaped channels on said rotor, said diaphragm registering with and projecting into said slots and forming the walls of the insides of the legs of said U-channels on said rotor.

4. In a jet reaction turbine for expansive motive fluid, a stator element, a drum type rotor element, structures forming a plurality of annular rows of U-shaped channels in both of said elements, said stator element being provided with a plurality of annular diaphragms, said rotor element being provided with a plurality of annular slots, said diaphragms registering with and extending into said slots, said diaphragms being partitions between a plurality of motive fluid pressure stages in said turbine, said slots being formed in each annular row of U-shaped channels on said rotor element, said slots being located between the legs of the U-shaped channels comprising each annular row of U-shaped channels on said rotor element.

5. In a jet reaction turbine comprising two members one member being rotatable relative to the other by a motive fluid, each of said members being provided with a series of annular rows of U-shaped channels, said annular rows of U-shaped channels being arranged in one member to register in axially overlapping relation with respective said annular rows of U-shaped channels in the opposite member to form an annular row of continuous motive fluid passages composed of a plurality of substantially parallel zigzag paths of increasing cross section from admission to exhaust in substantially axial direction.

6. In a jet reaction turbine comprising two members one member being rotatable relative to the other by a motive fluid, each of said members being provided with a series of annular rows of motive fluid direction reversing passages, said annular rows of motive fluid direction reversing passages being arranged in one member to register in axially overlapping relation with said annular rows of motive fluid direction reversing passages in the opposite member to form an annular row composed of a plurality of substantially parallel zigzag paths of increasing cross section from admission to exhaust in substantially axial direction for said motive fluid.

JOHN HUGH O'NEILL.